United States Patent [19]

Kassabov

[11] Patent Number: 4,591,981
[45] Date of Patent: May 27, 1986

[54] MULTIMICROPROCESSOR SYSTEM

[75] Inventor: Nikola K. Kassabov, Sofia, Bulgaria

[73] Assignee: V M E I "Lenin" Quartal Darvenitza, Sofia, Bulgaria

[21] Appl. No.: 488,701

[22] Filed: Apr. 26, 1983

[30] Foreign Application Priority Data

Apr. 26, 1982 [BG] Bulgaria ............................ 56357

[51] Int. Cl.[4] ............................................ G06F 15/16
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,753,234 | 8/1973 | Gilbert et al. | 364/200 |
| 4,149,242 | 4/1979 | Pirz | 364/200 |
| 4,344,134 | 8/1982 | Barnes | 364/200 |
| 4,388,683 | 6/1983 | Beifuss et al. | 364/200 |
| 4,412,285 | 10/1983 | Neches et al. | 364/200 |

*Primary Examiner*—Gareth D. Shaw
*Assistant Examiner*—Christina M. Eakman

[57] ABSTRACT

A multimicroprocessor system constructed of multimicroprocessor structures each including N-number of microprocessor units, a shared memory, an input/output unit and a register exchange circuit. The microprocessor units are uniform and include a microprocessor, a data memory, a parallel input-output interface, a sequential input/output circuit, a program memory and a bi-directional buffer. The buffer connects the internal data bus in the microprocessor unit to the shared instruction bus for the multimicroprocessor structure, and the enable inputs of the buffer are connected to the internal busses for circuit selection in the microprocessor unit by the microprocessor address lines. The address lines of the first microprocessor unit in the multimicroprocessor structure are connected also to a shared memory, input/output unit and both to the parallel data exchange register circuit and the "HALT" inputs of the microprocessors in the rest of the units through a logic circuit, which serves to switch off the microprocessor units. The multimicroprocessor structures are connected therebetween by first level data exchange register circuits, whose control inputs are connected to the address lines of the first microprocessor units in the respective first microprocessor structures. These first level register circuits are connected groupwise to a second level data exchange register circuit, whose control input is connected to the address lines of the microprocessor unit whose address lines are connected to the first of the first level data exchange register circuits.

2 Claims, 5 Drawing Figures

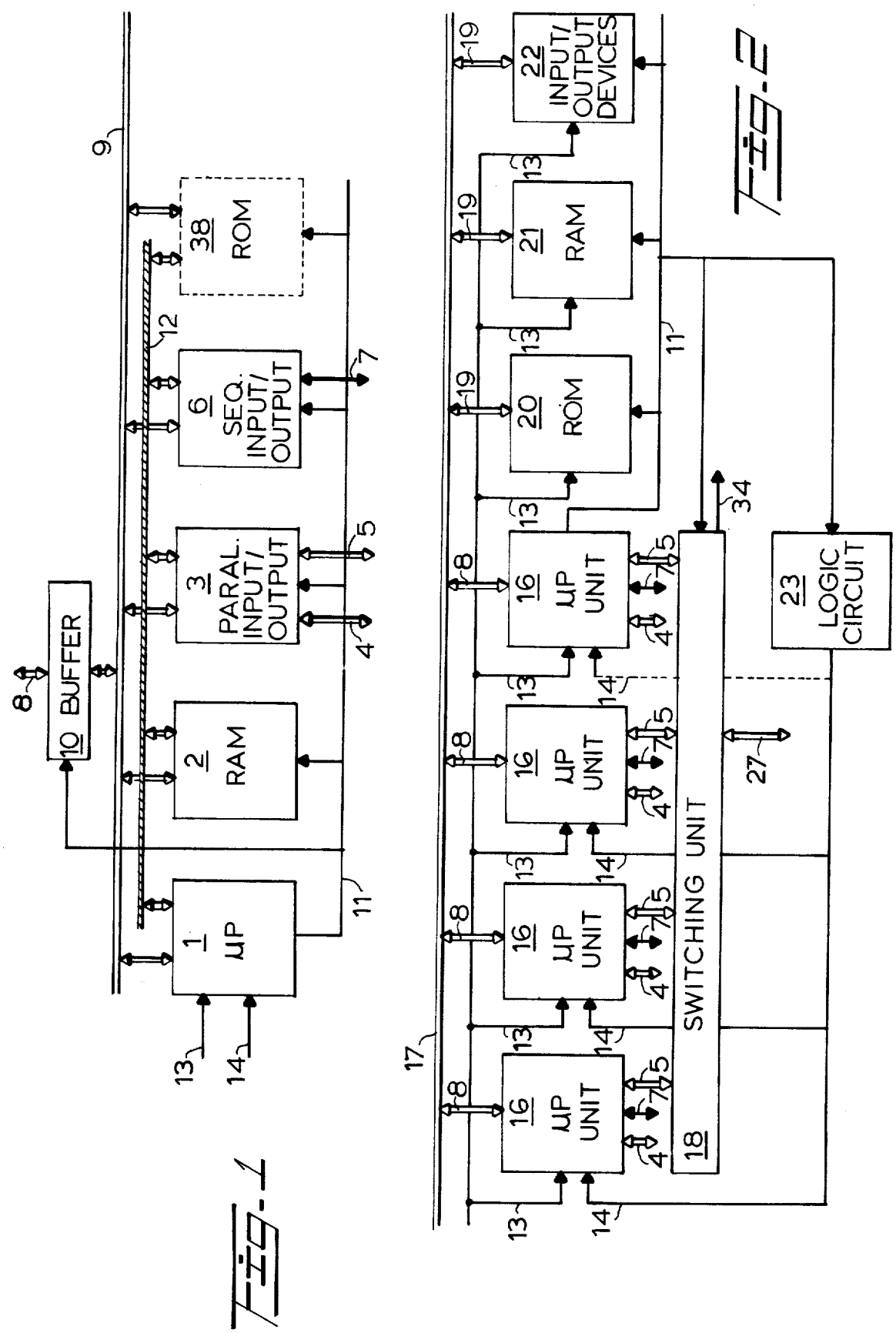

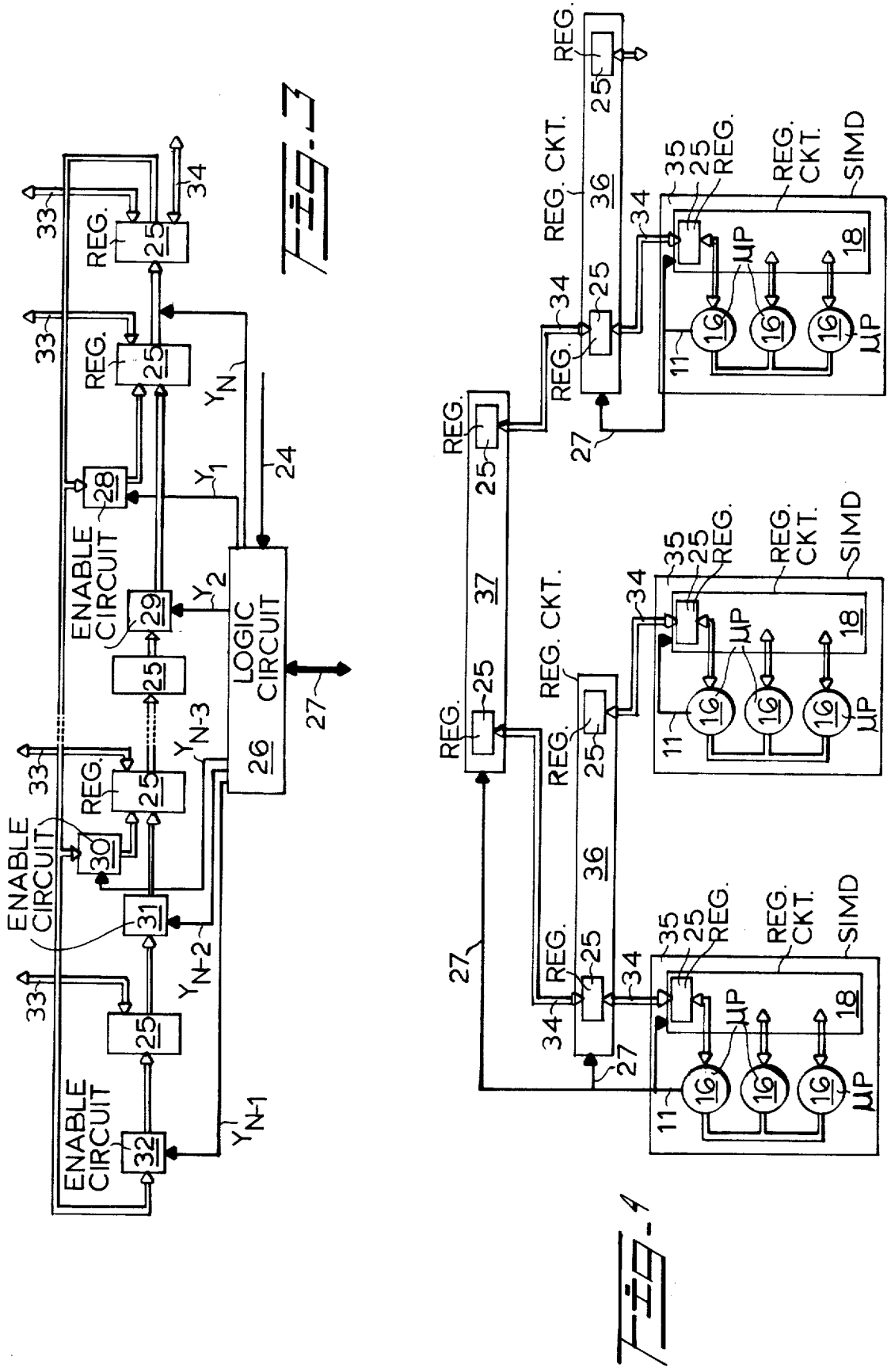

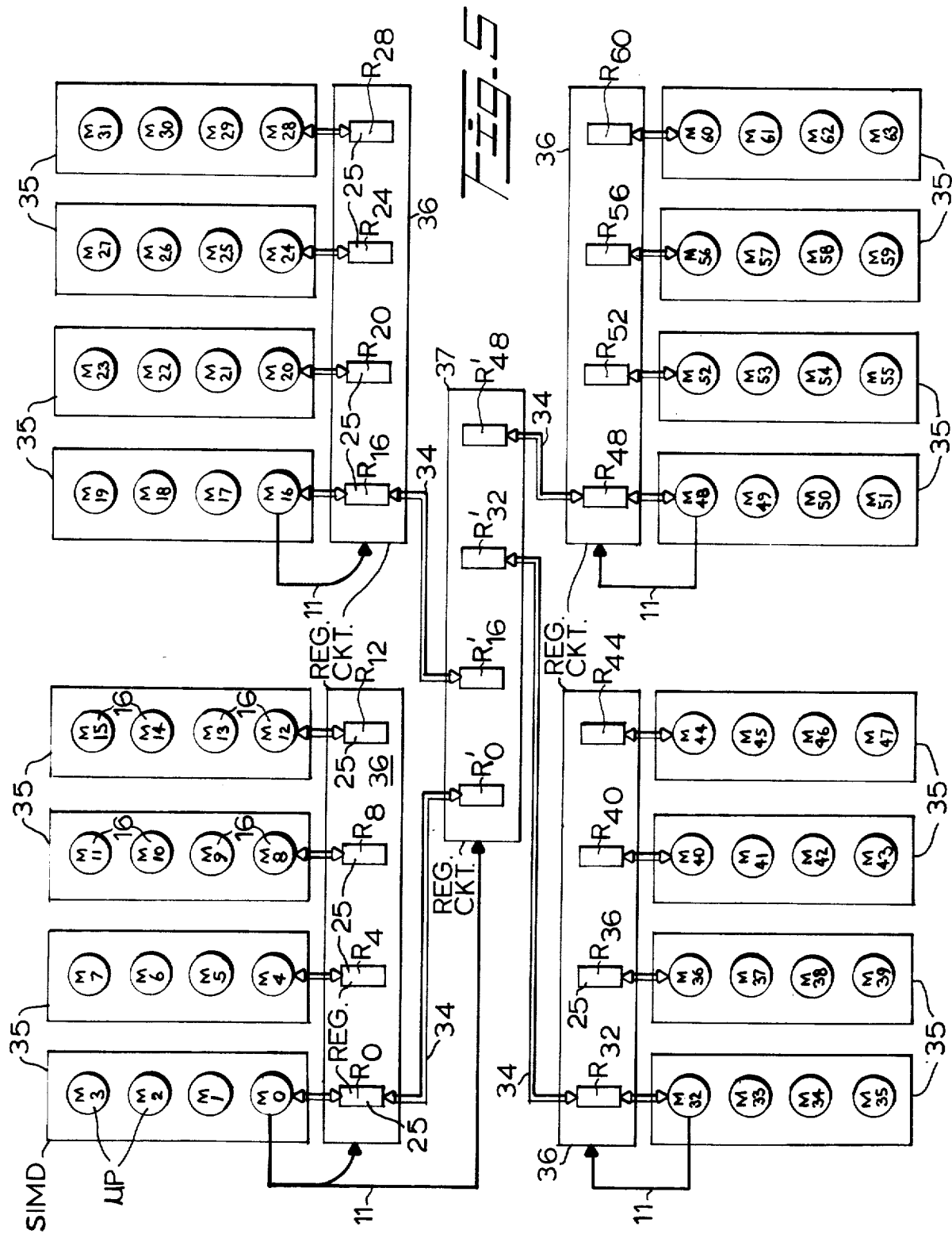

MULTIMICROPROCESSOR SYSTEM

BACKGROUND OF THE INVENTION

This invention relates to a multimicroprocessor system of the single instruction stream and multiple data streams (SIMD) type as well as to a multimicroprocessor system of multiple SIMD systems (MSIMD) type, which can find application in parallel processing of information for various specific classes of problems, such as high-speed Fourier transformation, vector and matrix calculations, simultaneous real-time processing of signals from different sources, processing of data from physical or other experiments, simultaneous control of a number of interconnected objects, and rapid solution of differential and linear equations. The electronic calculator devices and computers of the above type run their programs with all their SIMD or MSIMD groups of microprocessor units executing one and the same instruction at a time over different operands. Upon execution of several instructions, an information exchange between the units takes place.

SIMD and MSIMD microprocessor systems are known which comprise a control unit and executive microprocessor units specifically connected therebetween, in which all executive units are connected with the control unit through a single instruction line. A switching unit controlled by the control unit ensures the connection between said units by means of control lines for data exchange. All the units are connected through the switching unit to a common memory as well as to common data input/output circuits. The microprocessor units each comprise a microprocessor, a RAM-type memory and an input/output interface.

Hierachically structured multimicroprocessor systems are known where the units are arranged in a tree.

A disadvantage of the SIMD and MSIMD multimicroprocessor systems is their unfitness for implementation in universal, arbitrary microprocessor elements. Moreover, the control on such systems must be very complicated, which has an effect on the complexity of the control unit, which, in contrast to the other units, does not enable one to charge said unit with executive functions. The intermodular connection requires the availability of complex, specific circuits. The data exchange between the units is based on a sequential rather than a parallel principle thereby reducing the performance of the system as a whole. Such systems possess neither the flexibility required for extension (reconfiguration) by additional units nor the possibility for transformation from an SIMD into an MSIMD system and vice versa.

SUMMARY OF THE INVENTION

The object of this invention is to provide a multimicroprocessor system of SIMD and MSIMD type possessing both simple structure and controllability independent of the type of microprocessor elements used, simultaneously ensuring a rapid parallel data exchange between individual units and a high flexibility to reconfiguration, with the simplicity of intermodular connection being such that the requirement for complicated interface circuits and devices is avoided.

This object is achieved in a multimicroprocessor system constructed of microprocessor units in which each unit includes a microprocessor, RAM and interface circuits, and input/output for intermodular data exchange and an instruction input, said instruction input being connected to an internal "data" bus through a buffer circuit, and the address lines and microprocessor control lines being connected to the remaining elements in the microprocessor unit. The multimicroprocessor system includes N-number of microprocessor units with their instruction inputs connected to a shared "instruction" bus and their input/outputs for data exchange connected to a switching unit. According to this multimicroprocessor system, the microprocessor address lines for element selection in the microprocessor unit are connected to the buffer circuit which serves to disable the connection between the internal "data" bus and the instruction input of said microprocessor unit, wherein a shared ROM-type memory, a shared RAM-type memory and shared input/output devices are connected through their data lines to the instruction bus of the multimicroprocessor system, and the address lines of the first microprocessor unit, which appears also as a control input, are connected both to the shared memories and shared input/output devices and to the "HALT" inputs of the microprocessors in the microprocessor units through a logic circuit, which serves to switch off the microprocessor units, as well as to the switching unit, which is designed as a register data exchange circuit.

The above object is also achieved in a multimicroprocessor system in which the register circuit for parallel data exchange includes N-number of registers and a combination logic circuit, which connects the register input/outputs with the control input signals for data exchange between said registers, said combination logic circuit being characterized by $/\log_2(N+1)/$ inputs, i.e. the smallest natural number not less than $\log_2(N+1)$, for setting the exchange code, wherein the first output of the combination logic circuit is connected to the enable circuit for connection between the first register output and the second register input, the second output line of the combination circuit is connected to an enable circuit for connection between the third register output and the second register input, etc., the $(N-2)^{th}$ output line is connected to an enable circuit for connection between the first register output and the $(N-1)^{th}$ register input, and the last output line is connected to an enable circuit for connection between the first register output and the last register input, wherein each register is provided with an input/output for connection with a given microprocessor unit, and the first register is provided with an additional input/output.

The object of this invention is also achieved in a multimicroprocessor system which includes a number of SIMD multimicroprocessor systems hierarchically connected through a number of register data exchange circuits as those outlined above, where the additional input/outputs of the first registers in the data exchange register circuits of the SIMD multimicroprocessor systems are connected to the first hierarchic level data exchange register circuits, and the control inputs of register data exchange circuits are connected to the address lines of the first microprocessor unit in the first SIMD system within the group of systems; the additional input/outputs of the first level exchange register circuits are connected groupwise to the second level data exchange register circuits, the control inputs of said second level data exchange register circuits being connected to the address lines of that microprocessor unit whose address lines are connected to the first data exchange circuits in the group of first level data exchange registers, etc. On the last level of hierarchic connection between the microprocessor units, there is a single register data exchange circuit of the same type as that already discussed, with its exchange controlling inputs connected to the address lines of the first unit in the system.

The advantages of the microprocessor system consist in the possibility for its implementation using arbitrary microprocessor elements, i.e. both monolithic and TTL microprocessors and circuits. The main advantage consists in its simple structure and simple connection between the microprocessor units, which obviates the need for complicated interface units and circuits. Both the executive and control units are of one and the same type, and the control unit also performs control functions. The register circuit for parallel data exchange ensures the possibility for high speed data exchange between the microprocessor units, contrary to the available sequential data exchange systems. The multimicroprocessor system with its hierarchic organization of the connection between the individul units possesses substantial advantages over the known systems especially concerning some classes of problems such as matrix calculations, signal processing, sorting, etc. It is an important advantage of the multimicroprocessor system that it possesses a high flexibility both concerning its designing and reconfiguration from one type to another.

DESCRIPTION OF THE DRAWINGS

The invention is illustrated by an example embodiment in connection with the accompanying drawings, in which:

FIG. 1 is a block diagram of a microprocessor unit;

FIG. 2 is a structural diagram of the SIMD multimicroprocessor system;

FIG. 3 is a block diagram of the register data exchange circuit;

FIG. 4 is a structural diagram of a hierarchically structured multimicroprocessor system; and FIG. 5 is a provisional structural diagram of 64 multimicroprocessor system constructed of 16 SIMD multimicroprocessor systems where each system is provided with 4 microprocessor units.

DESCRIPTION OF THE PREFERRED EMBODIMENT

A microprocessor unit (FIG. 1) includes a microprocessor 1, a RAM-type memory 2, a parallel input/output 3, and is provided with an input/output for external data 4, an input/output for data exchange with other units 5, a circuit 6 for sequential input/output with corresponding input/output and control lines 7, and an instruction input 8 connected to an internal "data" bus 9 through a buffer 10. Address lines 11 and control lines 12 are connected to the rest of circuits in the microprocessor unit, while inputs for timing pulses 13 and halt (switching off) pulses (HALT) 14 are provided to the microprocessor 1. It is a feature of the microprocessor unit that the address lines 11 for selection of the rest of the circuits in the microprocessor unit, are connected to the buffer 10 which disables the connection between the internal bus 9 and the instruction input 8.

The multimicroprocessor structure (FIG. 2) consists of N-number of microprocessor units 16 with their instruction inputs 8 connected to a shared "instruction" bus 17 and their data exchange input/outputs 5 connected to a switching unit 18, a shared ROM-type memory 20, a shared RAM-type memory 21 and shared input/output devices 22 being connected through their respective data lines 19 to the instruction bus 17. The address lines 11 of the first microprocessor unit 16 which appears also as a control unit, are connected both to the shared memories 20, 21, the shared input/output devices 22 and HALT inputs 14 of the other microprocessor units 16 through logic circuit 23, which serves to switch off the microprocessor units 16, as well as to the switching unit 18, which is constructed as a register data exchange circuit. The internal connections of the address lines in the microprocessor units 16 and the connections between the first microprocessor unit address lines and the shared devices (20, 21, 22) are selected such that all the microprocessors possess one and the same allocation of their address fields, said fields containing the following addresses: addresses for RAM 2 and input/output devices 3 and 6 in the microprocessor unit, addresses for switching off each of the microprocessors through the logic circuit 23 as well as an address for switching off all the microprocessor units except the first one, an address for selection of the register data exchange circuit 18, addresses which represent exchange codes for the switching unit 18, addresses for storage of interruption addresses, and other addresses. The logic circuit 23 can be constructed from flip-flops of the "T" type, each of the outputs for the inputs 14 for switching off a microprocessor unit 16 being provided with one flip-flop. A signal to one of the flip-flops is sent in the case where a definite address is present on the address lines 11 of the first microprocessor unit 16. Also, a definite address enables the switching unit 18. In such a case, some of the direct addressable addresses can be over-lapped by the exchange addresses in the switching unit 18.

The register circuit 18 for parallel data exchange (FIG. 3) consists of N-number of registers 25 and a combination logic circuit 26 by which the /$\log_2(N+1)$/ number of control inputs 27 are, i.e. the smallest natural number not less than $\log_2(N+1)$, connected through the $y_1, y_2, \ldots, y_{N-1}$ outputs of the combination logic circuit 26 to the inputs and outputs, respectively, of the registers 25, wherein the first output $y_1$ of circuit 26 is connected to an enable circuit 28 for connection between the output of the first register 25 and the input of the second register 25, the second output $y_2$ is connected to an enable circuit 29 for connection between the third register output and the second register input, etc., the $N-3^{th}$ output line $y_{N-3}$ is connected with an enable circuit 30 for connection between the output of the first register 25 and the next to the last register 25 input, the output $y_{N-2}$ is connected with an enable circuit 31 for connection between the $N^{th}$ register output and the $(N-1)^{th}$ register input, and the output $y_{N-1}$ is connected with an enable circuit 32 for connection between the first register output and the last register input, all the registers 25 being provided with an input/output 33 for connection to a microprocessor unit 16 through its input 5, the first register 25 possessing also an additional input/output 34.

Hierarchically structured multimicroprocessor system (FIG. 4) includes several SIMD multimicroprocessor structures 35 connected therebetween by several register data exchange circuits 18, where the additional input/outputs 34 of the first registers 25 in a definite number of systems 35 are connected to first level exchange register circuits 36, whose control inputs 27 are connected to the address lines 11 of the first microprocessor units 16 in the first system of the group 35, the additional input/output 34 of the first registers 25 in the first level exchange register circuits 36 are groupwise connected to the second level exchange register circuits, whose control inputs are connected to the address lines of that microprocessor unit 16 whose address lines are connected to the first register circuit for first level data exchange 36, etc., wherein, on the last hierarchic level of connection between microprocessor units 16, there is a single register data exchange circuit 37, whose control inputs are connected to the address lines of the first microprocessor unit 16 in the first SIMD system. In this case, the address field of the first microprocessor unit 16 should contain also addresses for control of the exchange taking place in the exchange circuits on each level starting from zero and reaching to the last level, while the other control units 16 should contain a lower number of such addresses.

FIG. 5 shows a hierarchically structured MSIMD system consisting of 16 SIMD multimicroprocessor structures 35. Each structure 35 includes four microprocessor units 16 denoted as M0, . . . , M63, wherein each register data exchange circuit of zero (18), first (36) and second (37) level contains four registers 25 denoted as R0, R4, . . . , R60 with their numbers corresponding to the numbers of the units in the system. Register circuits 36 and 37 are controlled by the address lines of the first microprocessor units in the system. Systems of such a type can be designed with different number of units in the SIMD system 35 and different number of registers can be used in the register circuits. The minimum number of units in SIMD systems is two. A regular structure is achieved when all the SIMD systems include two modules (units) and each register circuit has two registers. Then, the number of levels is equal to $/\log_2 N/$. Connection in such systems resembles a tree structure.

The multimicroprocessor structure (FIG. 2) operates as follows. All the microprocessor units 16 are started by the same initial address contained in their program counters, i.e. the address of the first instruction in the program recorded in the shared memory 20. One and the same instruction is actually read out of the shared memory 20 only by the first microprocessor 16 and since the buffers 10 are open, the instruction code enters through the bus 17 to all the microprocessor units 16. When said instruction contains an address of a local RAM 2 operand, each microprocessor unit 16 excecutes the instruction on the data contained in said address in its own RAM 2. At this point, the buffer 10 is closed and the bus 17 and internal bus 9 are disconnected one from the other. Each microprocessor unit 16 executes the instruction as a stand alone microcomputer. Upon execution of a definite number of instructions, some data exchange between microprocessor units 16 may be needed. This is achieved as follows: each microprocessor unit 16 sends its data through its output 5 for exchange in its respective register 25 in the register data exchange circuit 18, wherein the process takes place in parallel and uses one and the same instruction (subprogram) series. Then, a dummy instruction (for example, a kind of comparison without any variation in the content of the cells of memory) is executed. The logic circuit 23 decodes the address of the dummy instruction and a "HALT" signal is sent to the inputs 14 in order to switch off the microprocessor units 16. Similarly, an address is sent, which serves to enable, again through the logic circuit 23, the exchange circuit 18. The first microprocessor unit 16 then begins to read and "execute" dummy instructions, whose addresses are exchange codes to the circuit 18, until the desired shift of data in registers 25 is reached. It is necessary either to ensure that the dummy instructions do not change the data contained in the first microprocessor unit 16, or if impossible, to store the condition code preliminarily. Said dummy instructions should be short enough so as to reduce the necessary exchange time. Then, all the microprocessor units 16 are switched on (possibly with the address they have been switched off by the "T" flip-flops in the logic circuit 23, or in some other way) and start the execution of a subprogram for reading one word length data from their registers 25 through the input 5 of the parallel input/output circuit 3. Then, execution of the next instruction or re-exchange can be made. The data in the RAM 2 of each microprocessor unit 16 can be entered in parallel through the inputs 4 or transferred from the shared RAM 21 through the instruction bus 17, wherein, during the process of transfer to a given microprocessor unit 16, the other microprocessor units 16 in the structure should be switched off in advance. Also, data can be entered sequentially into the microprocessor units 16 through the inputs 7 of the sequential input/output circuits 6. A clock-pulse generator (not shown) sends timing signals through the respective microprocessor inputs 13.

The register exchange circuit 18 operates as follows. When a definite code is sent to the input lines 27, one of the following transformations, subject to exchange between registers 25, is accomplished:

$$b_0 = \begin{matrix} 1\,2\ldots N \\ 1\,2\ldots N' \end{matrix}, b_1 = \begin{matrix} 1\,2\,3\ldots N \\ 2\,1\,3\ldots N' \end{matrix}, b_2 = \begin{matrix} 1\,2\,3\,4\ldots N \\ 2\,3\,1\,4\ldots N' \end{matrix}\ldots,$$

$$b_{N-1} = \begin{matrix} 1\,2\ldots N-1\,N \\ 2\,3\ldots N\quad 1 \end{matrix}, b_N = \begin{matrix} 1\,2\,3\ldots N-1\,N \\ 2\,3\,4\ldots N\quad N' \end{matrix}$$

in which the series given above includes serial numbers of those registers 25 which receive the content of the respective lower row of registers 25. Algorithms and programs exist for expansion of an arbitrary transformation for exchange between all N-number of registers in a series of $b_0, b_1, \ldots, b_N$ basic transformations. For example, if register (4) should send its given content into registers (1), (2) and (3) while receiving data from unit 1, and if the addresses which serve to accomplish the $b_0, b_1, b_2, b_3, b_4$ transformations are 80, 81, 82, 83, 84, respectively, and the address A73 serves to switch off the microprocessor units (all addresses are in hexadecimal), following series of instructions to be executed by the first microprocessor unit (N=4; contents of the microprocessor units subject to exchange are in their respective registers) is required: DI81, DI84, DI83 because the necessary exchange can be represented by the transformation $$\begin{matrix} 1234 \\ 4441 \end{matrix}$$

which expands itself into the $b_3, b_4, b_1$ series. The DIA73 instruction is introduced in advance, where DI is a dummy instruction code (i.e. instruction which does exist but does not initiate any reasonable action in view of the final result). If the transformation represents a permutation, then its expansion is not longer than $N-1$ and a simple analytical formula with corresponding program are available for this purpose.

MSIMD multimicroprocessor system operates as follows. Each SIMD structure 35 runs its own program, which, in particular, possibly coincides with the program of another structure 35. If necessary, all the microprocessor units 16 in the system can exchange data between each other as desired, i.e. in a manner, described by an arbitrary transformation of all the elements-units, said exchange being performed as follows: the necessary transformation (let it be a permutation p) is expanded into a product of cycles (12), (123), ..., (12 ... N), where N is the total number of units in the system. Then, the cycles are accomplished in a sequence by parallel basic permutations in the register circuits for exchange on each hierarchic level. For example, if the required permutation for the system of FIG. 5 is p=(0 2 4 ... 24 26 1 3 ... 25 27 28 29 ... 53 54) (which has been set as a single cycle and not as a notion in two rows), said permutation can be expanded by the standard procedure into the product (0 1 2 ... 25 26)·(0 1 2 ... 53 54). The first permutation is completed in three steps (one basic permutation in one step). During the first step, the permutations (0 1 2 3), (4 5 6 7), (8 9 10 11), (12 13 14 15), (16 17 18 19), (20 21 22 23), (24 25 26) are accomplished in parallel in the SIMD 35 systems, i.e., register circuits of zero level. During the second step, the permutations (0 4 8 12), (16 20 24) are accomplished in parallel in the register structures of first level. During the third step, the second level permutation (0 16) is accomplished, where the digits denote the numbers of the registers in the different level circuits, said numbers being equivalent to the numbers of the units in the system. The second permutation is accomplished also in three steps, where, during the first step, all complete cycles from (0 1 2 3) to (48 49 50 51) and the cycle (52 53 54) are accomplished. The cycles (0 4 8 12), (16 20 24 28), (32 36 40 44), (48 52) are accomplished in parallel in the second step, and the permutation (0 16 32 48) is accomplished in the third step. The complete permutation p is accomplished in 6 steps.

Multimicroprocessor systems can be constructed using different microprocessor families while preserving said organization. In an embodiment of the present invention, different microprocessor systems were designed based on the INTEL and MOTOROLA microprocessor families, said families being only illustrative and not restrictive to the invention. Methods, algorithms and programs for parallel solution of different classes of problems were developed for said systems.

When a ROM-type memory 38 is included in the microprocessor unit 16, the multimicroprocessor structure of FIG. 2 transforms into a SIMD/MIMD system, i.e. a system which allows for a functional reconfiguration from one type into another only according to the address contained in the program counter of the microprocessor 1 of said microprocessor unit 16. If the program counter addresses a program which has been included in the local memory 38, then the microprocessor unit 16 operates individually (i.e. the system is MIMD). It is possible that at times some of the microprocessor units 16 shown in FIG. 2 operate on their own programs while the rest of the microprocessor units 16 operate on the shared program contained in the shared ROM-type memory 20. Any microprocessor unit 16 can be switched from its own program to the shared program by an automatic call to an address which is outside the local address field of said microprocessor unit 16 and which contains a "common" for a number of microprocessor units 16 instruction. This functional reconfiguration, which takes place automatically, represents an essential advantage of the present invention especially due to its simplicity. This option extends the applicability of the present invention to various problems, increases the performance and results in memory savings for the system as a whole.

The presence of ROM-type memory 38 in the microprocessor unit 16 ensures the possibility for automatic functional reconfiguration of the hierarchically structured multimicroprocessor system from MSIMD into M-SIMD/MIMD, SIMD or MIMD system. This reconfiguration increases the efficiency since the possible parallelism in the solution of some problems is not adequate so as to load all the microprocessor units. In such a case, some of the microprocessor units would operate on their own programs. A multiprogram mode of operation in the system is possible, in which a system constructed of N-number of microprocessor units can process in parallel N different kinds of problems distributed to the N microprocessor units.

What is claimed is:

1. A multimicroprocessor system having a plurality of multimicroprocessor structures, each multimicroprocessor structure including N-number of microprocessor units coupled, collectively, to shared memory units and a shared input/output of the multimicroprocessor structure, said microprocessor units being the same and each microprocessor unit including a microprocessor, a data memory, a parallel input/output interface, a sequential input/output and a program memory; wherein said multimicroprocessor structures further comprise respective parallel data exchange register circuits to which the microprocessor units in each multimicroprocessor structure are respectively connected, said parallel data exchange register circuits having respective additional input/outputs; said multimicroprocessor system further comprising first level data exchange register circuits, to which said additional input/outputs of said parallel data exchange register circuits are connected, each first level data exchange register circuit having a control input, connected to address lines in a first of the microprocessor units in a first of said multimicroprocessor structures, and further additional input/outputs, and said multimicroprocessor system further comprising a second level data exchange register circuit, to which said further additional input/outputs of said first level data exchange register circuits are connected, said second level data exchange register circuit having a control input connected to the address lines in the first of the microprocessor units in the first of said multimicroprocessor structures in a first of said first level data exchange register circuits; and each of said microprocessor units further comprising a bi-directional buffer which serves to connect an internal data bus to a shared instruction bus in said multimicroprocessor structure for all of the microprocessor units, the buffer having enable inputs connected to internal busses for circuit selection in the microprocessor unit by the address lines of the microprocessor unit, the address lines of the first microprocessor unit being connected also to the shared memory units in the multimicroprocessor structure, to the shared input/output as well as both to the respective parallel data exchange register circuits and "HALT" inputs of microprocessors in the other microprocessor units in each multimicroprocessor structure through a logic circuit, which serves to switch off the microprocessor units.

2. A multimicroprocessor system as claimed in claim 1, wherein the parallel data exchange register circuits each comprise N-number of interconnected registers, a combination circuit and bi-directional busses for input-/output of data to the registers, wherein /$\log_2(N+1)$/ number of control inputs, i.e. the smallest natural number not less than $\log_2(N+1)$, are provided to the combination circuit with the outputs of said combination circuit connected to enable circuits for parallel connection between registers, where a first of said outputs is connected to an enable circuit for connection between an output of a first of said registers and an input of a second of said registers, a second of said outputs is connected to an enable circuit for connection between an output of a third of said registers and an input of the second register, and a $(N-3)^{th}$ of said outputs is connected to an enable circuit for connection between the first register output and an input of the next to the last register, an $(N-2)^{th}$ of said outputs is connected to an enable circuit for connection between an output of a last of said registers and the next to the last register input, a $(N-1)^{th}$ of said outputs is connected to an enable circuit for connection between the first register output and an input of the last register, and an $N^{th}$ of said outputs is connected so as to enable the connection between the second register output and the first register input, where the first register is provided with said additional input/output.

* * * * *